United States Patent
Ye

(10) Patent No.: US 7,655,291 B2
(45) Date of Patent: *Feb. 2, 2010

(54) SMOOTH CO-EXTRUDED POLYESTER FILM INCLUDING TALC AND METHOD FOR PREPARING SAME

(75) Inventor: Yijun Ye, Saunderstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/685,263

(22) Filed: Oct. 14, 2003

(65) Prior Publication Data

US 2005/0079342 A1    Apr. 14, 2005

(51) Int. Cl.
*B32B 7/00* (2006.01)
*B32B 27/18* (2006.01)
*B32B 27/20* (2006.01)
*B32B 27/36* (2006.01)
*B32B 37/15* (2006.01)

(52) U.S. Cl. ............... 428/141; 428/195.1; 428/212; 428/323; 428/331; 428/343; 428/403; 428/404; 428/457; 428/458; 428/480; 428/910; 264/173.11; 264/173.12; 264/173.15; 264/173.16; 264/288.4; 264/290.2; 156/244.11; 156/244.24

(58) Field of Classification Search ............... None
See application file for complete search history.

(56) References Cited

U.S. PATENT DOCUMENTS

| | | | |
|---|---|---|---|
| 3,154,461 A * | 10/1964 | Johnson | 428/159 |
| 3,821,156 A * | 6/1974 | Farrar | 523/181 |
| 4,375,494 A | 3/1983 | Stokes | |
| 4,399,179 A * | 8/1983 | Minami et al. | 428/212 |
| 5,391,429 A | 2/1995 | Otani | |
| 5,521,002 A * | 5/1996 | Sneed | 428/331 |
| 5,648,159 A | 7/1997 | Sato | |
| 5,811,197 A | 9/1998 | Nishiyama | |
| 5,919,536 A | 7/1999 | Bennett et al. | |
| 6,174,943 B1 | 1/2001 | Matsumoto et al. | |
| 6,214,440 B1 * | 4/2001 | Peiffer et al. | 428/141 |
| 6,291,053 B1 * | 9/2001 | Peiffer et al. | 428/141 |
| 6,326,461 B1 * | 12/2001 | Giroux et al. | 530/200 |
| 6,329,451 B2 * | 12/2001 | Matsumoto et al. | 524/80 |
| 6,358,604 B1 * | 3/2002 | Peiffer et al. | 428/336 |
| 6,376,042 B1 * | 4/2002 | Peiffer et al. | 428/141 |
| 6,420,019 B1 * | 7/2002 | Peiffer et al. | 428/332 |
| 6,423,401 B2 * | 7/2002 | Peiffer et al. | 428/216 |
| 6,428,882 B1 * | 8/2002 | Peiffer et al. | 428/220 |
| 6,500,890 B2 * | 12/2002 | Edwards et al. | 524/425 |
| 6,528,144 B2 * | 3/2003 | Peiffer et al. | 428/141 |
| 6,573,359 B2 * | 6/2003 | Nichols et al. | 528/491 |
| 6,607,808 B2 * | 8/2003 | Peiffer et al. | 428/141 |
| 6,627,295 B2 * | 9/2003 | Peiffer et al. | 428/141 |
| 6,709,731 B2 * | 3/2004 | Murschall et al. | 428/141 |
| 6,727,306 B2 * | 4/2004 | Edwards et al. | 524/425 |
| 6,913,817 B2 * | 7/2005 | Klein et al. | 428/323 |
| 7,141,293 B2 | 11/2006 | Peiffer et al. | |
| 7,157,132 B2 * | 1/2007 | Murschall et al. | 428/141 |
| 2002/0068158 A1 * | 6/2002 | Peiffer et al. | 428/220 |
| 2002/0071945 A1 * | 6/2002 | Peiffer et al. | 428/220 |
| 2003/0054129 A1 * | 3/2003 | Murschall et al. | 428/97 |
| 2003/0064195 A1 * | 4/2003 | Murschall et al. | 428/141 |
| 2003/0087105 A1 * | 5/2003 | Murschall et al. | 428/423.7 |
| 2003/0108754 A1 * | 6/2003 | Murschall et al. | 428/480 |
| 2003/0157352 A1 * | 8/2003 | Murschall et al. | 428/483 |
| 2004/0040640 A1 | 3/2004 | Bordes | |
| 2005/0079342 A1 | 4/2005 | Ye | |
| 2006/0008638 A1 * | 1/2006 | Kiehne et al. | 428/323 |
| 2007/0110959 A1 * | 5/2007 | Yokota et al. | 428/141 |

FOREIGN PATENT DOCUMENTS

| | | |
|---|---|---|
| EP | 0490704 A2 | 6/1992 |
| EP | 1176163 A | 1/2002 |
| WO | WO-03/035726 A1 | 5/2003 |

OTHER PUBLICATIONS

International Search Report mailed Apr. 17, 2008, directed at International Application No. PCT/US07/084082; 11 pages.

\* cited by examiner

*Primary Examiner*—Vivian Chen
(74) *Attorney, Agent, or Firm*—Morrison & Foerster LLP

(57) ABSTRACT

A co-extruded film including talc and a method for preparing the film includes a polyester resin containing talc. The films may be single layer films or multi-layered structures such as ABA or AB structured films. Multi-layered films have talc in at least the A layer of the multi-layered film. If talc is present in the B layer, the A layer preferably includes a greater percentage of talc relative to the percentage of talc present in said B layer. The method uses readily available, low cost talc as an additive to achieve a co-extruded polyester film having simultaneously reduced transparency and reduced gloss to provide a translucent polyester film.

34 Claims, No Drawings

SMOOTH CO-EXTRUDED POLYESTER FILM INCLUDING TALC AND METHOD FOR PREPARING SAME

TECHNICAL FIELD

This invention relates to a polyester film and, more particularly, relates to a smooth co-extruded translucent polyester film containing talc and a method for preparing the same.

BACKGROUND

Translucent and semi-gloss films are widely used in industry. There are different ways to obtain the desired properties in such films. For example, a film can be made semi-gloss by casting the film to a matte surface. Various additives with different refractive indices can be added to prepare films having reduced transparency or to prepare films having a translucent appearance. For extruded polyester films, additives such as silicon oxide and titanium oxide are widely used in the extrusion process to obtain translucent or white films. Coating or co-extruding a skin layer is known to enhance the semigloss properties over the translucent properties of a film. Additionally, it is known to utilize incompatibility between the additives and polyethylene terephthalate (PET) to create voids to prepare white film. In many cases, highly incompatible organic polymer particles such as polymethylpentane are added to produce translucency in a film.

Talc and other layered inorganic materials have been used in te plastics industry due to the ability of these materials to increase dimensional stability, flexural modulus, and impart improvement in heat distortion temperature. For polypropylene film, these materials have been used as antiblocking and/or nucleation agents. Talc has also been combined with polyurethane to facilitate crystallization of a polyurethane composition, particularly a polyester-based polyurethane composition. For example, U.S. Pat. No. 6,458,880 discloses a polyurethane composition containing polyurethane (e.g., a polyester-based polyurethane) and sufficient talc to provide a crystallization temperature of the polyurethane composition that is at least 10° C. greater than the crystallization temperature of the polyurethane composition without talc. The addition of talc can enable rapid formation of products by, for example, injection molding, compression molding, extrusion, and film formation techniques. Talc has also been used in flame retardant films as an effective material for preventing dripping such as in U.S. Pat. No. 6,174,943. The disclosures of the foregoing are incorporated herein by reference in their entirety.

SUMMARY OF THE INVENTION

We discovered the use of readily available, low cost talc as an additive to achieve a polyester film having simultaneously reduced transparency and reduced gloss. Generally, talc is known to have a moderate adhesion to polyester. When a polyester film is stretched, microvoids are created that render the film translucent. It is believed that, due to random reflection at the film surface and interior, gloss reduction is achieved at the same time. This method comprising co-extrusion technology allows control of the gloss and transparency or haze of a film. The films may comprise single layer or multi-layer films wherein at least one layer comprises talc and include but are not limited to ABA co-extrusion, AB co-extrusion, TV stabilized films, metallized films, and reverse printing applications comprising the films.

This invention relates to a translucent polyester film including a co-extruded mixture of polyester resin and talc.

This invention also relates to a method for preparing a co-extruded polyester film including mixing a polyester resin and talc, and co-extruding the polyester resin and the talc to provide a co-extruded translucent polyester film.

The invention comprises a co-extruded film including talc comprising:
- a polyester resin containing talc to provide a translucent polyester film;
- the translucent polyester film having a single layered structure or a layered structure selected from an ABA layered structure and an AB layered structure;
- wherein the single layer or the A layer if the film is a multi-layer film comprises talc; the B layer, if present, optionally comprises talc; and
- if talc is present in the B layer, the A layer preferably comprises a greater percentage of talc relative to the percentage of talc present in the B layer.

These and other features and advantages of the invention will be more fully understood from the following description of certain specific embodiments of the invention.

DETAILED DESCRIPTION

In accordance with one aspect of the invention, a polyester resin containing talc provides a co-extruded translucent polyester film. The co-extruded translucent polyester film may comprise a single layer or a multi-layer film. The multi-layer films most preferably include films having a layered structure selected from an ABA layered structure and an AB layered structure. In single layer embodiments, the single layer is extruded with talc-containing resin. The method comprises compounding a polyester resin with talc and co-extruding the flat talc material with the resin to form a film.

The polyester film may be prepared by conventional co-extrusion methods known in the art. Most preferably, the polyester comprises polytheneterephthalate (PET). The co-extruded talc-containing polyester film is then uniaxially oriented or, preferably, biaxially oriented such as by stretching to form the translucent polyester film. It is believed that the flat, plate-like talc aligns with the surface of the film and fills in the microvoids in the film. We have discovered that this method provides a translucent film having improved high clarity in combination with low gloss characteristics.

Talc is a layered or plate-like (platy) magnesium silicate having the general chemical formula $3MgO.4SiO_2.H_2O$. It is composed of alternating layers comprising MgO sandwiched between layers of $SiO_2$. These stacks of triple sheet crystalline units are held together by van der Waals forces. They are chemically inert and can be ground into platy structures. The aspect ratio (defined as the length of the particle divided by the thickness), which gives an indication of platy structure, can be as high as about 25 for talc. Talc can be characterized by median size and top size, with top size usually being determined using a Hegman-type gage. For example, a Hegman of 6 is a top size of 26 microns and a Hegman of 4 is a top size of 50 microns.

When the particle size of the talc is increased, the film has increased haze. When the particle size of the talc is decreased, the clarity of the film is increased. In this invention, the talc has a median particle size (e.g. diameter) from about 0.1 micrometer to about 20 micrometers, more preferably from about 0.5 micrometer to about 10 micrometers, and most preferably from about 0.8 micrometer to about 5 micrometers.

The surface of the talc plates can be modified to improve adhesion between the polymer and the talc, such as by treating with silanes, cationic polymers, stearates and the like.

The films in accordance with the invention can be single layer films (A layer) or multi-layer films such as, for example, AB or ABA structured layered films. The preferred concentration of talc in the single A layer is from about 0.1% to about 20%, more preferably from about 0.5% to about 15%, and most preferably from about 1% to about 10%, based upon total weight of the composition.

For AB and ABA layered films, the B layer may optionally comprise talc. If talc is included in the B layer, the talc is present in the B layer in an amount that is preferably less than the amount of talc in the A layer. The AB co-extrusion provides a film having an A side that is matte and a B side that is glossy.

In AB and ABA layered films, the preferred concentration of talc in the A layer, is from about 0.1% to about 20%, more preferably from about 0.5% to about 15%, and most preferably from about 1% to about 10% based upon total weight of the composition. The preferred concentration of talc in the B layer, if present, is from about 0% to about 20%, more preferably from about 0.5% to about 15%, and most preferably from about 1% to about 10% based upon total weight of the composition.

The films may be prepared at any thickness, as desired. Most preferably, the films have a total thickness of about 5 to about 500 micrometers, more preferably about 8 to about 250 micrometers, and most preferably about 10 to about 100 micrometers.

If desired, the film may comprise flame retardant PET or non-flame retardant PET. Other materials and additives conventionally employed in the manufacturing of polyester film may be included, if desired. Such materials and additives include organic and inorganic additives. The additives include, but are not limited to, antioxidants, optical brighteners, dyes, pigments, UV absorbers, and anti-blocking agents. There are no limitations as to the particular methods for incorporating these additives into the polymer. Incorporation may be accomplished, for example, by incorporating covalently, by incorporating during polymerization, or by way of mater-batch.

Another aspect of the invention comprises preparing a metallized film from the co-extruded translucent talc containing film. The co-extruded translucent talc containing film has a matte side and an opposite shiny side. If the film is metallized on the matte side, a silver matte appearance is achieved on both sides of the film. If the film is metallized on the glossy side, a shiny, mirror like appearance is achieved on one side of the film and silver matte appearance is achieved on the opposite side of the film.

In yet another aspect of the invention, a reverse printed film is provided. PET films are often a primary substrate for graphic applications. The clarity, dimensional stability, ability to be printed or inked, and relative low cost make PET films a key material for various labels, signage, and other applications. Reverse printing of PET is a common technique utilized to bury the printed image behind the protective PET substrate. In reverse printing, an image is literally printed in reverse and is viewed through the substrate. The clarity of PET films often makes them a substrate of choice for this application.

Many reverse printed applications exist. For example, many durable label applications exist whereby the image being buried behind the PET substrate increases the durability of the inked image to scratching, abrasion and moisture. Such label structures may be utilized for labeling devices used outdoors like tractors, ladders and multiple other devices. Various types of reverse printed signage media exist including different types of POT (point of purchase) signage, backlit signage, and others. Reverse printing the image affords protection of the image by the film surface. Often the image is coated with a PSA (pressure sensitive adhesive) to facilitate anchorage to a secondary substrate.

We discovered that reverse printing onto the co-extruded translucent PET film increases the durability of the image in terms of scratch resistance while also improving the long-term stability of the image from fading due to the harmful effects of UV light within solar radiation. Preferably, particularly when intended for outdoor applications, the film will contain one or more UV absorbers.

EXAMPLES

Selected aspects of the invention will now be illustrated with reference to the following examples. Films prepared in accordance with aspects of the invention were prepared using talc, regular PET and flame retardant PET resin in the amounts shown in the Table 1 below. The talc was compounded with the PET resin and extruded into cast film of various thicknesses. The cast film was further stretched biaxially in a polyester film line to obtain biaxially oriented polyester film. The films were then tested for gloss, haze and color characteristics.

The mechanical properties, including tensile strength and elongation at break, were measured using a tensile tester per ASTM D-882. The thickness of the film was measured using a micrometer.

Haze of the film was measured using a Byk Gardner Haze Gard Plus Hazemeter according to ASTM D1003. It defines haze as that percentage transmitted light which in passing through the specimen deviates from the incident beam by more than 2.5 degrees on the average. Clarity is evaluated in an angle range smaller than 2.5 degrees.

60 degree gloss of the film was measured using a Byk Gardner Trigloss meter. A film sample holder was used to tighten the film for the measurement. The sample holder was black so that any transmitted light will be absorbed.

The surface roughness was measured on a 3-dimensional Kosaka Laboratory Ltd. surface profiler using a contact stylus. The surface roughness SRa was calculated and recorded.

Four types of talc were used. They were available from Luzenac America, Englewood CO and The Kish Company, Inc., Mentor, Ohio. Two types were surface modified to improve the adhesion to polyester:

Talc1: Cimpact 710, median size 1.8 µm and top size 12.5 µm (7 Hegman) from Luzenac.

Talc2: Cimpact CB7, surface treated, median size 1.8 µm and top size 12.5 µm (7 Hegman) from Luzenac.

Talc3: Flextalc 610, median size 1.0 µm and top size 6 µm from Kish.

Talc4: Flextalc 9102S surface treated, median size 2-3 µm, top size 14 µm from Kish.

Laser+® polyethylene terephthalate, is a bottle grade copolyester commercially available from DAK Americas, Chadds Ford, Pa. It is believed to contain small amount of isophthalate copolymer and was used in the compounding process. The intrinsic viscosity (IV) of this resin was 0.83.

In the film making process, two other polyester resins were used in addition to the talc masterbatches. They were Toray plain PET homopolymer F1CC and KoSa flame-retardant PET copolyester FR8934. Toray plain PET resin had an IV of about 0.61. KoSa flame retardant copolyester FR8934 is a phosphate containing polymer and had an IV of 0.66.

Example 1

Into polyethylene terephthalate copolyester Laser+® resin, 30% by weight of talc1 was mixed into a co-rotating twin screw extruder. The extruded strands were cooled in a water trough and pelletized via cutting on a rotary cutting line.

The resultant pellets were then admixed with plain PET homopolymer F1CC resin and flame-retardant copolyester FR8934 resin to form blended pellets. The blended pellets were then co-extruded and cast into sheets of film in a polyester pilot line. Biaxially oriented film was prepared at total thickness of 23 µm (0.92 mil). The film was co-extruded in an A/B/A structure. The thickness of A and B layers were 2 and 19 µm, respectively, and the total talc concentrations in A and B layers were 3.0% and 2.0%, respectively, by weight.

The film was semi-glossy and hazy and no discoloration of the cast film was noted. The average 60-degree gloss of this film was 44. The haze, total luminous transmittance, and clarity were 66.2%, 83.7%, and 21.2%, respectively. The surface roughness SRa was 171 nm.

Example 2

Into polyethylene terephthalate copolyester Laser+® resin, 30% by weight of talc2 was mixed into a co-rotating twin screw extruder. The extruded strands were cooled in a water trough and pelletized via cutting on a rotary cutting line.

The resultant pellets were then admixed with plain PET homopolymer F1CC resin and flame-retardant copolyester FR8934 resin to form blended pellets. The blended pellets were then co-extruded and cast into sheets of film in a polyester pilot line. Biaxially oriented film was prepared at total thickness of 23 µm (0.92 mil). The film was co-extruded in an A/B/A structure. The thickness of A and B layers were 2 and 19 µm, respectively, and the total talc concentrations in A and B layers were 3.0% and 2.0%, respectively, by weight.

The film was semi-glossy and hazy and no discoloration of the cast film was noted. The average 60-degree gloss of this film was 66. The haze, total luminous transmittance, and clarity were 62.2%, 79.2%, and 44.0%, respectively. The surface roughness SRa was 165 nm.

Example 3

Into polyethylene terephthalate copolyester Laser+® resin, 30% by weight of talc3 was mixed into a co-rotating twin screw extruder. The extruded strands were cooled in a water trough and pelletized via cutting on a rotary cutting line.

The resultant pellets were then admixed with plain PET homopolymer F1CC resin and flame-retardant PET copolyester FR8934 resin to form blended pellets. The blended pellets were then co-extruded and cast into sheets of film in a polyester pilot line. Biaxially oriented film was prepared at total thickness of 23 µm (0.92 mil). The film was co-extruded in an A/B/A structure. The thickness of A and B layers were 2 and 19 µm, respectively, and the total talc concentrations in A and B layers were 3.0% and 2.0%, respectively, by weight.

The film was semi-glossy and hazy and no discoloration of the cast film was noted. The average 60-degree gloss of this film was 51. The haze, total luminous transmittance, and clarity were 53.0%, 86.5%, and 40.2%, respectively. The surface roughness SRa was 167 nm.

Reference Example 4

Into polyethylene terephthalate copolyester Laser+® resin, 30% by weight of talc4 was mixed into a co-rotating twin screw extruder. The extruded strands were cooled in a water trough and pelletized via cutting on a rotary cutting line.

The resultant pellets were then admixed with plain PET homopolymer F1CC resin and flame-retardant PET copolyester FR8934 resin to form blended pellets. The blended pellets were then co-extruded and cast into sheets of film in a polyester pilot line. Biaxially oriented film was prepared at total thickness of 23 µm (0.92 mil). The film was co-extruded with an A/B/A structure. The thickness of A and B layers were 2 and 19 µm, respectively, and the total talc concentrations in A and B layers were 3.0% and 2.0%, respectively, by weight.

The film was semi-glossy and hazy and no discoloration of the cast film was noted. The average 60-degree gloss of this film was 47. The haze, total luminous transmittance, and clarity were 62.0%, 85.1%, and 29.0%, respectively. The surface roughness SRa was 217 nm.

Reference Example 5

Into polyethylene terephthalate copolyester Laser+® resin, 30% by weight of talc2 was mixed into a co-rotating twin screw extruder. The extruded strands were cooled in a water trough and pelletized via cutting on a rotary cutting line.

The resultant pellets were then admixed with palin PET homopolymer F1CC resin to form blended pellets. The blended pellets were then extruded and cast into sheets of film in a polyester pilot line. Biaxially oriented film was prepared at the thickness of 12 µm (0.48 mil). The film was a monolayer film and the talc concentrations was 4.0%.

The film was semi-glossy and hazy and no discoloration of the cast film was noted. The average 60-degree gloss of this film was 48. The haze, total luminous transmittance, and clarity were 55.9%, 83.6%, and 24.0%, respectively. The surface roughness SRa was 127 nm.

Example 6

Into polyethylene terephthalate copolyester Laser+® resin, 30% by weight of talc3 was mixed into a co-rotating twin screw extruder. The extruded strands were cooled in a water trough and pelletized via cutting on a rotary cuting line.

The resultant pellets were admixed with plain PET homopolymer F1CC resin to form blended pellets. The blended pellets were then co-extruded and cast into sheets of film in a polyester pilot line. Biaxially oriented film was prepared at total thickness of 23 µm (0.92 mil). The film was co-extruded in an A/B structure. The thickness of A and B layers were 4 and 19 µm, respectively, and the total talc concentrations in A and B layers were 3.0% and 0%, respectively, by weight.

The film was semi-glossy on one side and glossy on the other side. The average 60-degree gloss of this film was 97 on one side and 128 on the other side. The haze, total luminous transmittance, and clarity were 17.9%, 88.3%, and 85.0%, respectively. The surface roughness SRa on A side was 77 nm.

Example 7

Into polyethylene terephthalate copolyester Laser+® resin, 30% by weight of talc3 was mixed into a co-rotating twin screw extruder. The extruded strands were cooled in a water trough and pelletized via cutting on a rotary cutting line.

The resultant pellets were then admixed with plain PET homopolymer F1CC resin to form blended pellets. The blended pellets were then co-extruded and cast into sheets of film in a polyester pilot line. Biaxially oriented film was prepared at total thickness of 23 µm (0.92 mil). The film was co-extruded with an A/B structure. The thickness of A and B layers were 4 and 19 µm, respectively, and the total talc concentrations in A and B layers were 6.0% and 0%, respectively, by weight.

The film was semi-glossy on one side and glossy on the other side. The average 60-degree gloss of this film was 59 on one side and 124 on the other side. The haze, total luminous transmittance, and clarity were 45.1%, 81.1%, and 74.0%, respectively. The surface roughness of the rough side of the film SRa was 89 nm.

Example 8

Into polyethylene terephthalate copolyester Laser+® resin, 30% by weight of talc1 was mixed into a co-rotating twin screw extruder. The extruded strands were cooled in a water trough and pelletized via cutting on a rotary cutting line.

The resultant pellets were then admixed with plain PET homopolymer F1CC resin and flame-retardant PET copolyester FR8934 resin to form blended pellets. The blended pellets were then co-extruded and cast into sheets of film in a polyester pilot line. Biaxially oriented film was prepared at a total thickness of 23 µm (0.92 mil). The film was co-extruded with an A/B/A structure. The thickness of A and B layers were 2 and 19 µm, respectively, and the total talc concentrations in A and B layers were 3.0% and 2.0%, respectively, by weight.

The film was semi-glossy and hazy and no discoloration of the cast film was noted. The average 60-degree gloss of this film was 48. The haze, total luminous transmittance, and clarity were 57.7%, 85.8%, and 25.9%, respectively. The surface roughness SRa was 147 nm.

Example 9

Into polyethylene terephthalate copolyester Laser+® resin, 30% by weight of talc1 was mixed into a co-rotating twin screw extruder. The extruded strands were cooled in a water trough and pelletized via cutting on a rotary cutting line.

The resultant pellets were then admixed with plain PET homopolymer F1CC resin to form blended pellets. The blended pellets were then co-extruded and cast into sheets of film in a polyester pilot line. Biaxially oriented film was prepared at total thickness of 50 µm (2 mil). The film was co-extruded with an A/B/A structure. The thickness of A and B layers were 4 and 42 µm, respectively, and the total talc concentrations in A and B layers were 3.0% and 1.5%, respectively, by weight.

The film was semi-glossy and hazy and no discoloration of the cast film was noted. The average 60-degree gloss of this film was 77. The haze, total luminous transmittance, and clarity were 82.2%, 67.3% and 35.7%, respectively. The surface roughness SRa was 109 nm.

Example 10

Into polyethylene terephthalate copolyester Laser+® resin, 30% by weight of talc3 was mixed into a co-rotating twin screw extruder. The extruded strands were cooled in a water trough and pelletized via cutting on a rotary cutting line.

The resultant pellets were then admixed with plain PET homopolymer F1CC resin to form blended pellets. The blended pellets were then co-extruded and cast into sheets of film in a polyester pilot line. Biaxially oriented film was prepared at total thickness of 23 µm (0.92 mil). The film was co-extruded with an A/B structure. The thickness of A and B layers were 4 and 19 µm, respectively, and the total talc concentrations in A and B layers were 6.0% and 0%, respectively, by weight.

The film was then metallized on A side (semi-glossy side) using a bell jar metallizer with an optical density of about 2.5. The film had silver matte appearance on both sides.

Example 11

Into polyethylene terephthalate copolyester Laser+® resin, 30% by weight of talc3 was mixed into a co-rotating twin screw extruder. The extruded strands were cooled in a water trough and pelletized via cutting on a rotary cutting line.

The resultant pellets were then admixed with plain PET homopolymer F1CC resin to form blended pellets. The blended pellets were then co-extruded and cast into sheets of film in a polyester pilot line. Biaxially oriented film was prepared at total thickness of 23 µm (0.92 mil). The film was co-extruded with an A/B structure. The thickness of A and B layers were 4 and 19 µm, respectively, and the total talc concentrations in A and B layers were 6.0% and 0%, respectively, by weight.

The film was then metallized on B side (glossy side) using a bell jar metallizer with an optical density of about 2.5. The film had silver matte appearance on the semi-glossy side but a shiny, mirror like appearance on the opposite side.

Example 12

Into polyethylene terephthalae copolyester Laser+® resin, 30% by weight of talc3 was mixed into a co-rotating twin screw extruder. The extruded strands were cooled into a water trough and pelletized via cutting on a rotary cutting line.

The resultant pellets were then admixed with plain PET homopolymer F1CC resin to form blended pellets. The blended pellets were then co-extruded and cast into sheets of film in a polyester pilot line. Biaxially oriented film was prepared at total thickness of 23 µm (0.92 mil). The film was co-extruded with an A/B structure. The thickness of A and B layers were 4 and 19 µm, respectively, and the total talc concentrations in A and B layers were 6.0% and 0%, respectively, by weight.

The film was then coated on B side (glossy side) with a general purpose water based acrylic adhesive Aeroset 3255. The film was corona treated before coating. This adhesive had 55% solid and a #40 rod was used for the coating. The film was then dried for 2-3 min in a 160° C. convection oven. The whole structure was laminated using the coated adhesive to a digital printed picture on a photographic paper from an Epson Stylus Pro 7500 printer. The laminated picture had a low gloss surface but high contact clarity.

Example 13

Into polyethylene terephthalate copolyester Laser+® resin, 30% by weight of talc3 was mixed into a co-rotating twin screw extruder. The extruded strands were cooled in a water trough and pelletized via cutting on a rotary cutting line.

The resultant pellets were then admixed with plain PET homopolymer F1CC resin to form blended pellets. The blended pellets were then co-extruded and cast into sheets of film in a polyester pilot line. Biaxially oriented film was prepared at total thickness of 23 μm (0.92 mil). The film was co-extruded with an A/B structure. The thickness of A and B layers were 4 and 19 μm, respectively, and the total talc concentrations in A and B layers were 6.0% and 0%, respectively, by weight.

The film was then coated on B side (glossy side) with a general purpose clear inkjet coating, IJ60 from Esprit Chemical. The film was corona treated before coating. A #80 rod was used for the coating. The film was then dried for 2 min in a 160° C. convection oven. On this inject coating a picture was printed reversely using an Epson Stylus Pro 7500 printer. By looking through from the semi-glossy side, the picture appeared low gloss, non-glare but had high clarity.

Paper Example 14

Example 12 but with UV absorbers in the film (both A and B layer, preferably more in A layer). The overlamination picture will be UV and fade-resistant.

Paper Example 15

Example 13 but with UV absorbers in the film (both A and B layer, preferably more in A layer). The reversely printed picture will be UV and fade-resistant.

Comparative Example 1

A commercially available 92G PET film Mylar EB11. It is believed to be a monolayer matte film with spherical silica particles. The film was semi-glossy and hazy. The average 60-degree gloss of this film was 52. The haze, total luminous transmittance, and clarity were 65.0%, 84.8%, and 34.0%, respectively. The average surface roughness SRa was 237 nm.

Comparative Example 2

A commercially available 92G PET film Lumirror XZ33. It is a monolayer matte film with spherical silica particles. The film was semi-glossy and hazy. The average 60-degree gloss of this film was 45. The haze, total luminous transmittance, and clarity were 68.4%, 87.1%, and 38.8%, respectively. The average surface roughness SRa was 298 nm.

Comparative Example 3

A commercially available 92G PET film Lumirror XZ700. It is a monolayer matte film with spherical silica particles. The film was semi-glossy and hazy. The average 60-degree gloss of this film was 44. The haze and total luminous transmittance were 73.6% and 82.8%, respectively. The average surface roughness SRa was 351 nm.

Comparative Example 4

A commercially available 200G PET film Melinex 475. It is believed to be a monolayer matte film. The film was semi-glossy and translucent. The average 60-degree gloss of this film was 91. The haze, total luminous transmittance, and clarity were 97.9%, 56.2%, and 3.1 %, respectively. The average surface roughness SRa was 79 nm.

The examples are summarized in Table 1.

TABLE 1

Test conditions and properties of Semigloss/Translucent PET Film

| Example # | Total Thickness | Structure | Layer thickness (μm) | Filler | Filler % | Total Filler % | Average 60 degree gloss Side A | Average 60 degree gloss Side B | Haze % | TLT % | Clarity % | SRa (nm) |
|---|---|---|---|---|---|---|---|---|---|---|---|---|
| 1 | 92 G (23 μm) | A/B/A | 2/19/2 | Talc1 | 3.0/2.0/3.0 | 2.17 | 37 | 50 | 66.2 | 83.7 | 21.2 | 170.7 |
| 2 | 92 G (23 μm) | A/B/A | 2/19/2 | Talc2 | 3.0/2.0/3.0 | 2.17 | 66 | 66 | 62.2 | 79.2 | 44.0 | 165.4 |
| 3 | 92 G (23 μm) | A/B/A | 2/19/2 | Talc3 | 3.0/2.0/3.0 | 2.17 | 39 | 62 | 53.0 | 86.5 | 40.2 | 166.7 |
| Refer. Ex 4 | 92 G (23 μm) | A/B/A | 2/19/2 | Talc4 | 3.0/2.0/3.0 | 2.17 | 39 | 55 | 62.0 | 85.1 | 29.0 | 217.2 |
| Refer. Ex 5 | 48 G (12 μm) | Monolayer | 12 | Talc2 | 4.0 | 4.0 | 49 | 46 | 55.9 | 83.6 | 24.0 | 127.2 |
| 6 | 92 G (23 μm) | A/B | 4/19 | Talc3 | 3.0/0 | 0.52 | 128 | 97 | 17.9 | 88.3 | 85.0 | 76.6 |
| 7 | 92 G (23 μm) | A/B | 4/19 | Talc3 | 6.0/0 | 1.04 | 124 | 59 | 45.1 | 81.1 | 74.0 | 88.9 |
| 8 | 92 G (23 μm) | A/B/A | 2/19/2 | Talc1 | 3.0/2.0/3.0 | 2.17 | 39 | 57 | 57.7 | 85.8 | 25.9 | 147.0 |
| 9 | 200 G (50 μm) | A/B/A | 4/42/4 | Talc1 | 3.0/1.5/3.0 | 1.74 | 68 | 86 | 82.2 | 67.3 | 35.7 | 108.8 |
| Mylar EB11 | 92 G | Monolayer | | Silica | | | 53 | 51 | 65.0 | 84.8 | 34.0 | 236.5 |
| Lumirror XZ33 | 92 G | Monolayer | | silica | | | 49 | 41 | 68.4 | 87.1 | 38.8 | 298.0 |
| Lumirror XZ700 | 92 G | Monolayer | | silica | | | 44 | 43 | 73.6 | 82.8 | | 351.2 |

TABLE 1-continued

Test conditions and properties of Semigloss/Translucent PET Film

| Example # | Total Thickness | Structure | Layer thickness (μm) | Filler | Filler % | Total Filler % | Average 60 degree gloss Side A | Side B | Haze % | TLT % | Clarity % | SRa (nm) |
|---|---|---|---|---|---|---|---|---|---|---|---|---|
| Melinex 475 | 200 G | Mono-layer | | | | | 72 | 110 | 97.9 | 56.2 | 3.1 | 79.4 |

Haze is due to wide-angle scattering—the light is diffused in all directions equally. It causes a loss of contrast and is commonly referred to as haze or milkiness. Clarity is due to narrow angle scattering. It describes how well very fine details may be resolved in an object. This is also known as see through quality. While haze is distance independent, clarity is dependent on distance. That means the greater the distance between object and transparent and transparent material the worse the see through quality (contact clarity).

The gloss reduction of gloss of platy like filler is different from spherical particles like silica. When using silica, the particle sizes and the amount are generally larger, because it is mainly a surface effect. This can be seen from the larger surface roughness of the silica filled matte film. The reduction of gloss of talc filled film is probably due to the random reflection of the talc plates in the film. The fact is that some existence of microvoids will certainly reduce the gloss. The contribution from surface roughness should not be as significant as spherical particles.

While this invention has been described by reference to certain preferred embodiments, it should be understood that numerous changes can be made within the spirit and scope of the inventive concepts described. Accordingly, it is intended that the invention not be limited to the disclosed embodiments, but that it have the full scope permitted by the language of the following claims.

The invention claimed is:

1. A co-extruded multi-layer translucent polyester film having a matte side and an opposed relatively smooth side, wherein the polyester film consists essentially of a co-extruded AB or ABA structure,
    wherein at least one A layer of the film comprises a mixture of a polyester resin and talc, at least one B layer comprises a polyester resin and optionally comprises talc, and the at least one A layer contains a higher percentage content of talc by weight than the at least one B layer,
    wherein the total concentration of talc in the at least one A layer is from about 0.5% to about 15% based upon total weight of the layer, and
    wherein the gloss level measured at 60 degree angle from an A layer side is about 39 or greater, and wherein the surface roughness (SRa) of the at least one A layer is between or equal to 76.6 nm and 147 nm.

2. The film of claim 1, wherein said polyester resin in said A layer and said polyester resin in said B layer comprises polyethylene terephthalate.

3. The film of claim 1, wherein said film is uniaxially oriented.

4. The film of claim 1, wherein said film is biaxially oriented.

5. The film of claim 1, wherein said talc comprises surface modified talc.

6. The film of claim 1, wherein said talc has a median particle size of about 0.1 micrometer to about 20 micrometers.

7. The film of claim 1, wherein said talc has a median particle size of about 0.5 micrometer to about 10 micrometers.

8. The film of claim 1, wherein said talc has a median particle size of about 0.8 micrometer to about 5 micrometers.

9. The film of claim 1, further comprising a metallized layer.

10. The film of claim 9, wherein said film has a matte side and said metallized layer is on said matte side.

11. The film of claim 9, wherein said film has a relatively smooth side and said metallized layer is on said relatively smooth side.

12. The film of claim 1, wherein said film comprises a reverse printed film.

13. The film of claim 12, further comprising one or more UV absorbers.

14. The film of claim 12, further comprising an adhesive layer.

15. The film of claim 1, wherein said film comprises a flame retardant film.

16. The film of claim 1, wherein said film comprises a non-flame retardant film.

17. The film of claim 1, wherein said film comprises an additive selected from the group consisting of organic additives, inorganic additives, antioxidants, optical brighteners, dyes, pigments, UV absorbers, antiblocking agents, and combinations thereof 18. A method for preparing a co-extruded multi-layer translucent polyester film having a matte side and an opposed relatively smooth side, wherein the polyester film consists essentially of an AB or ABA structure, comprising:
    mixing a polyester resin and talc to form a starting mixture for at least one A layer;
    preparing a starting mixture for at least one B layer comprising a polyester resin and optionally comprising talc; and
    co-extruding the starting mixtures of the least one A layer and the at least one B layer to produce the co-extruded multi-layer translucent polyester film with the AB or ABA structure,
    wherein the at least one A layer contains a higher percentage content of talc by weight than the at least one B layer and wherein the total concentration of talc in the at least one A layer is from about 0.5% to about 15% based upon total weight of the layer, and
    wherein the gloss level measured at 60 degree angle from an A layer side is about 39 or greater, and wherein the surface roughness (SRa) of the at least one A layer is between or equal to 76.6 nm and 147 nm.

19. The method of claim 18, wherein said polyester resin in said A layer and said polyester resin in said B layer comprises polyethylene terephthalate.

20. The method of claim 18, further comprising uniaxially stretching said co-extruded polyester film.

21. The method of claim 18, further comprising biaxially stretching said co-extruded polyester film.

22. The method of claim 18, wherein said talc comprises surface modified talc.

23. The method of claim 18, wherein said talc has a median particle size of about 0.1 micrometer to about 20 micrometers.

24. The method of claim 18, wherein said talc has a median particle size of about 0.5 micrometer to about 10 micrometers.

25. The method of claim 18, wherein said talc has a median particle size of about 0.8 micrometer to about 5 micrometers.

26. The method of claim 18, further comprising metallizing said co-extruded polyester film.

27. The method of claim 26, wherein said film has a matte side and said-metallizing is performed on said matte side.

28. The method of claim 26, wherein said film has a relatively smooth side and said metallized layer is on said relatively smooth side.

29. The method of claim 18, further comprising reverse printing an image on said film.

30. The method of claim 29, wherein said co-extruded translucent polyester film comprises one or more UV absorbers.

31. The method of claim 30, further comprising disposing an adhesive layer on said film.

32. The method of claim 18, wherein said film comprises a flame retardant film.

33. The method of claim 18, wherein said film comprises a non-flame retardant film.

34. The method of claim 18, wherein said film comprises an additive selected from the group consisting of organic additives, inorganic additives, antioxidants, optical brighteners, dyes, pigments, UV absorbers, antiblocking agents, and combinations thereof.

* * * * *